US007904878B2

(12) United States Patent
Kolathur et al.

(10) Patent No.: US 7,904,878 B2
(45) Date of Patent: Mar. 8, 2011

(54) SIMPLIFYING GENERATION OF DEVICE DRIVERS FOR DIFFERENT USER SYSTEMS TO FACILITATE COMMUNICATION WITH A HARDWARE DEVICE

(75) Inventors: Venugopal Kolathur, Belgaum (IN); Parag Balwant Naik, Bangalore (IN); Ravindragouda Kalagouda Patil, Belguam (IN); Vishwakumara Kayargadde, Bangalore (IN)

(73) Assignee: Vayavya Technologies Private Limited, Belgaum (IN)

( * ) Notice: Subject to any disclaimer, the term of this patent is extended or adjusted under 35 U.S.C. 154(b) by 1034 days.

(21) Appl. No.: 11/672,515

(22) Filed: Feb. 7, 2007

(65) Prior Publication Data

US 2008/0155572 A1 Jun. 26, 2008

(30) Foreign Application Priority Data

Dec. 26, 2006 (IN) .............................. 2423/CHE/2006

(51) Int. Cl.
*G06F 9/44* (2006.01)
(52) U.S. Cl. ......... 717/106; 717/104; 717/107; 717/108; 719/322; 719/327
(58) Field of Classification Search .......... 717/104–109, 717/113, 126, 128; 719/321–327; 710/8–10; 709/220–227
See application file for complete search history.

(56) References Cited

U.S. PATENT DOCUMENTS

| 5,999,730 | A | 12/1999 | Lewis | |
| 6,334,162 | B1* | 12/2001 | Garrett et al. | 710/54 |
| 2002/0170039 | A1* | 11/2002 | Kovacevic | 717/138 |
| 2005/0039193 | A1* | 2/2005 | Choi et al. | 719/321 |
| 2006/0033945 | A1 | 2/2006 | McDonald et al. | |

FOREIGN PATENT DOCUMENTS

WO 2006020948 A1 2/2006

OTHER PUBLICATIONS

Dehlin, G.L.; Automating test driver generation [airborne software]; IEEE, 1990, pp. 107-110.*
Shaojie Wang; Sharad Malik; Synthesizing operating system based device drivers in embedded systems; IEEE, 2003, Oages:37-44.*
Zhang et al., Automatic Generation of Device Drivers, ACM, 2003, pp. 60-69.*
"Tetsuro Katayama, Keizo Saisho, and Akira Fukuda", "Proposal of a Support System for Device Driver Generation", Sixth Asia Pacific Software Engineering Conference 1999 (APSEC '99) Proceedings, Dec. 7-10, 1999, pp. 494-497.
"Qing-Li Zhang and Ming-Yuan Zhu","http://www.coretek.com.cn/ Download/DeltaDEVIL5.pdf ", "DELTADEVIL—An Automatic Way for Device Driver Development", Downloaded circa Nov 2, 2007, pp. 1-42.

(Continued)

*Primary Examiner* — Wei Y Zhen
*Assistant Examiner* — Satish Rampuria
(74) *Attorney, Agent, or Firm* — Rahman LLC

(57) ABSTRACT

Generating device drivers for different user systems to facilitate communication with a hardware device. A device specification containing a program logic specifying the manner in, which external devices can communicate with the hardware device, is received as one input. A software specification specifying various characteristics of a runtime environment (e.g., operating system, processor, hardware components) is received as another input. A device driver generator then programmatically parses the input specifications and automatically generates the device driver code.

24 Claims, 15 Drawing Sheets

OTHER PUBLICATIONS

"Christopher L. Conway and Stephen A. Edwards", "NDL: A Domain-Specific Language for Device Drivers", Jun. 11-13, 2004, Copyright 2004 ACM, pp. 1-7.

"Tetsuro Katayama, Keizo Saisho and Akira Fukuda", "http://earth.cs.miyazaki-u.ac.jp/~kat/papers/pdf/iasted99.pdf", "Generating a Device Driver With a Formal Specification Language", Downloaded circa May 29, 2006, pp. 1-6.

"Windriver PCI for Linux", http://www.jungo.com/linux.html, Downloaded circa Nov. 2, 2007, pp. 1-4.

"Slam Project", http://research.microsoft.com/slam/, Downloaded circa Nov. 3, 2007.

"Tetsuro Katayama, Keizo Saisho, and Akira Fukuda", "Prototype of the Device Driver Generation System for Unix-Like Operating Systems", Principles of Software Evolution 2000 Proceedings, International Symposium on Nov. 1-2, 2000, pp. 302-310.

"Yong Hoon Choi, Woo Il Kwon, and Heung Nam Kim", "Code Generation for Linux Device Driver", Advanced Communication Technology, 2006, ICACT 2006—The 8th International Conference, vol. 1, Date: Feb. 20-22, 2006, pp. 734-737.

"Jun Sun, Wanghong Yuan, Mahesh Kallahalla, and Nayeem Islam", "Hail: A Language for Easy and Correct Device Access", Proceedings of the 5th ACM international conference on Embedded software EMSOFT '05, Sep. 2005. pp. 1-9.

\* cited by examiner

```
511: device_name = "pc16550D";
512: manufacturer_name = "National Semiconductors";
513: device_version = NONE;

521: DATA_REGISTERS {
522:     RBR [8] @ 0 {              // Receiver Buffer Register
523:             type = RO;
524:             value_on_reset = 0;
525:     }

526:     THR [8] @ 0 {              // Transmitter Holding Register
527:             type = WO;
528:             value_on_reset = 0;
529:     }
530: }

531: INTERRUPT_REGISTERS {
532:     IIR[8] @ 2 { // Interrupt Identification Register
533:             type = RO;
534:             udf IntPend <0:0> { // Interrupt Pending
535:                     type = RO;
536:                     mode = DC;
537:                     value_on_reset = 1;
538:             }
539:             udf IntID <1:3> { // Interrupt ID
540:                     type = RO;
541:                     mode = DC;
542:                     value_on_reset = 0;
543:                     udconst {
544:                             name = IntID;
545:                             ModemStat = 'h00;
546:                             TxRegEmpty = 'h01 for write;
547:                             TimeOut = 'h06;
548:                             RxDataAv = 'h02 for read;
549:                             RxLineStat = 'h3;
550:                     }
551:             }
552:             RESERVED <4:5> = 0;// Reserved
553:             udf FifoEnbd <6:7> { // FIFO Enabled
554:                     type = RO;
555:                     mode = DC;
556:                     value_on_reset = 0;
557:                     udconst {
558:                             feature_name = fifo_enabled;
559:                             enabled = 'h1;
560:                             disabled = 'h0;
561:                     }
562:             }
563:     }
564:}
```

*FIG. 5A*

```
565: feature configure_baud_rate {           //spec lang
566:     input t_baud_rate baud (50,75,110,9600,128000);
567:     local Divisor;
568:     Divisor = $bsp_spec.dev_frequency / (baud * 16);
569:     LCR.dlab = TRUE;
570:     DLL = Divisor & 'h00ff;
571:     DLM = (Divisor >> 8) & 'h00ff;
572:     LCR.dlab = FALSE;
573: }

574: feature device_read {            //spec lang impl
575:     output dest_ptr;
576:     if(1==LSR.dr) { // long as there is some data available in the fifo
577:         dest_ptr = RBR (error = device_read:1)
578:     }
579:}

580: feature device_write {           //spec lang impl
581:     input BYTE data;
582:     THR = data;
583:}

584: Interrupt_spec {
585:     Interrupt_Pending = IIR.IntPend ;

586a:    IIR.IntID.TxRegEmpty {
586b:            Enable  = IER.etbei;
586c:            Disable = IER.etbei;
586d:            Clear   = COR IIR;
586e:            Feature = device_write;
586f:    }

587a:    IIR.IntID.RxDataAv {
587b:            Enable  = IER.erbfi;
587c:            Disable = IER.erbfi;
587d:            Clear   = COR RBR;
587e:            Feature = device_read;
587f:    }
588: }

589: FIFO {
590:     fifo_enable = FCR.FifoEnb;
591:     fifo_size = 16;
592:     fifo_resize = FCR.RcvTrgr;
593: }
```

608: device_register_access {
609:      type = memory_mapped;
610:      address = 0x8000;
611:}

612: processor_spec {
613:      name = 80186          // mainly used for bsp function generation if
614:      clock_speed = 100M    // used for timing calculations
615:      endian = little
616:      word_length = 16
617:      mmu = no
618:      address = flat
619: }

620: entry_point {
621:      entry_point = USER_SPECIFIED
622:      entry_point_qualifier = blocking
623: }

624: call_conv = direct
625: re_entrancy = disable_interrupt

626: io_reg_declaration = hash_defines  // can be specified as unions

627: isr_spec {
628:      isr_type = single         // can be split when there is an OS. Please note
629:      isr_comm = global_var     // already explaned by Parag
630:      interrupt_stack = no      // if yes, the driver will have to create a stack
631:      interrupt_number = 4      // the irq number
632: }

633: bsp_spec {
634:      dev_frequency = 1.84M
635:      // save_context =
636:      // restore_context =
637:      // register_interrupt =
638:      // enable_interrupt =
639:      // disable_interrupt =
640:}

641: error_handling {
642:      retry = 5
643:}
```

FIG. 6A

```
655: os = linux

658: device_register_access {
659:     type = memory_mapped;
660:     address = 0x8000;
661:}

662: processor_spec {
663:     name = 80186
664:     clock_speed = 100M
665:     endian = little
666:     word_length = 16
667:     mmu = no
668:     address = flat
669:}
670:entry_point {
671:     entry_point = POSIX          // linux. implied. no need to specify.
672:     entry_point_qualifier = blocking // What to do when enough data is not
673:}

674: call_conv = direct
675: re_entrancy = disable_interrupt

676: io_reg_declaration = hash_defines

677: isr_spec {
678:     isr_type = split
679:     isr_comm = global_var
680:     interrupt_stack = no
681:     interrupt_number = 4 // the irq number
682:}

683: bsp_spec {
684:     frequency = 1.84M
685:     // save_context =
686:     // restore_context =
687:     // register_interrupt =
688:     // enable_interrupt =
689:     // disable_interrupt =
690:}

691: error_handling {
692:     retry = 5
693:}
```

*FIG. 6B*

```
701: #define MEMORY_Start_Address (0x8000)

702: #define RBR_RgOffAddr        (MEMORY_Start_Address + 0)
703: #define RBR_RgRd             ((*RBR_RgOffAddr))
704: #define RBR_rbr_udfRd             ((RBR_RgRd) >> 0x00)

705: #define THR_RgOffAddr        (MEMORY_Start_Address + 0)
706: #define THR_RgWr(ByteVal)    ((*THR_RgOffAddr) = ByteVal)
707: #define THR_WrRg     ((*THR_RgOffAddr))
708: #define THR_thr_udfWr(ByteVal)    ((THR_WrRg) |= (ByteVal << 0x00))

709: #define IIR_RgOffAddr        (MEMORY_Start_Address + 2)
710: #define IIR_RgRd             (*(IIR_RgOffAddr))

711: #define IIR_IntPend_udfRd    (((IIR_RgRd) & 0x01) >> 0)

712: typedef enum eInterrupt_Pending {
713:             Pending = 0,
714:             NotPending = 1
715:             } eInterrupt_Pending;

716: #define IIR_IntID_udfRd      (((IIR_RgRd) & 0x0E) >> 1)
717: #define IIR_FifoEnbd_udfRd   (((IIR_RgRd) & 0xC0) >> 6)

718: typedef enum eIntID {
719:             ModemStat   = 0x00,
720:             TxRegEmpty  = 0x01,
721:             TimeOut     = 0x06,
722:             RxDataAv    = 0x02,
723:             RxLineStat  = 0x03
724:             } eIntID;

725: #define di()    __asm__("cli")
726: #define ei()    __asm__("sti")

727: #define GET_GLOBAL_INDICES(W_INDEX, R_INDEX)\
728:     di();\
729:     W_INDEX = g_write_index;\
730:     R_INDEX = g_read_index;\
731:     ei()

732: #define SET_READ_INDEX(COUNT)\
733:     di();\
734:     g_read_index += COUNT;\
735:     ei()

736: #define GET_TX_STATUS(FLAG) \
737:     di(); \
738:     FLAG = gTxBuffEmpty; \
739:     ei()

740: #define SET_TX_STATUS(STATUS) \
741:     di(); \
742:     gTxBuffEmpty = STATUS; \
743:     ei()
```

*FIG. 7*

```
800a: static int gTriggerLevel;
800b: int g_frequency = 1840000;
800c: #define MAX_RETRY 5

801: int config_baud_rate(t_baud_rate baud)
802: {
803:     int Divisor = g_frequency/(baud*16);
804:     LCR_dlab_udfWr(TRUE);
805:     DLL_dll_udfWr(Divisor&0x00ff);
806:     DLM_dlm_udfWr((Divisor>>8)&0x00ff);
807:     LCR_dlab_udfWr(FALSE);
808: }

809: int device_read(unsigned char *dest_ptr)
810: {
811:     if(1 == LSR_dr_udfRd())
812:     {
813:         *dest_ptr = RBR_RegRd;
814:         return(0);
815:     } else {
816:         return(-1);
817:     }
818: }

819: int device_write(char data)
820: {
821:     if (LSR_THRE_udfrd == 1)
822:         THR_RgWr(data);
823: }

824: static ISR_SW()
825: {
826:     int Intr_ID;
827:     while(IIR_IntPend_udfRd == Pending)
828:     {
829:         Intr_ID=IIR_IntID_udfRd;
830:         switch(Intr_ID)
831:         {
832:             case RxDataAv:
833:             {
834:                 int Index;
835:                 for (Index = 0;Index < gTriggerLevel;Index++) {
836:                     if (g_write_index == 0) {
837:                         device_read(&gRxDataBuff[0]);
838:                         g_write_index++;
839:                         continue;
840:                     }
841:                     device_read(&gRxDataBuff[g_write_index % MTU_SIZE]);
842:                     if((g_write_index + 1) == g_read_index) {
843:                         g_read_index++; // informing the user about overrun
844:                     }
845:                     if (g_write_index + 1 == 0) {
846:                         g_write_index %= MTU_SIZE;
847:                         g_read_index %= MTU_SIZE;
```

*FIG. 8A*

```
848:            }
849:                    g_write_index++;
850:            }
851:                break;
852:        }
853:            case TxRegEmpty:
854:                gTxBuffEmpty = EMPTY;
855:                break;
856:            default:
857:                break;
858:        }
859:    }
860: }

861: ISR_HW()
862: {
863:     di();
864:     SaveContext();
865:     ISR_SW();
866:     RestoreContext();
867:     ei();
868:     ireturn();
869: }

870: static int register_ISR(void *ISR_fn, int IntrNo)
871: {
872:     di();
873:     IntrNo*4=(ISR_fn&0xffff);
874:     IntrNo*4+2=((ISR_fn>>16)&0xffff)
875:     IER_erbfi_udfWr(TRUE);
876:     IER_etbei_udfWr(TRUE);
877:     IER_elsi_udfWr(TRUE);
878:     ei();
879: }

880: static int SaveContext()
881: {
882:     __asm__ (      "push(ES)\n\t"     "push(DS)\n\t"
883:             "push(DI)\n\t"     "push(SI)\n\t"
884:             "push(DX)\n\t"     "push(CX)\n\t"
885:             "push(BX)\n\t"     "push(AX)\n\t"
886:                     "push(Status_Flag)"
887:             );
888: }

889: static int RestoreContext()
890: {
891:     __asm__ (      "pop(ES)\n\t"      "pop(DS)\n\t"
892:             "pop(DI)\n\t"      "pop(SI)\n\t"
893:             "pop(DX)\n\t"      "pop(CX)\n\t"
894:             "pop(BX)\n\t"      "pop(AX)\n\t"
895:             "pop(Status_Flag)"
896:             );
897: }
```

*FIG. 8B*

```
901: #include <asm/irq.h>
902: #include <linux/interrupt.h>

911: #define MEMORY_Start_Address (0x8000)

912: #define RBR_RgOffAddr          (MEMORY_Start_Address + 0)
913: #define RBR_RgRd               ((*RBR_RgOffAddr))
914: #define RBR_rbr_udfRd                    ((RBR_RgRd) >> 0x00)

915: #define THR_RgOffAddr          (MEMORY_Start_Address + 0)
916: #define THR_RgWr(ByteVal)      ((*THR_RgOffAddr) = ByteVal)
917: #define THR_WrRg               ((*THR_RgOffAddr))
918: #define THR_thr_udfWr(ByteVal) ((THR_WrRg) |= (ByteVal << 0x00))

919: #define IIR_RgOffAddr (MEMORY_Start_Address + 2)
920: #define IIR_RgRd               (*(IIR_RgOffAddr))

921: #define IIR_IntPend_udfRd      (((IIR_RgRd) & 0x01) >> 0)

922: typedef enum eInterrupt_Pending {
923:                 Pending = 0,
924:                 NotPending = 1
925:             } eInterrupt_Pending;

926: #define IIR_IntID_udfRd        (((IIR_RgRd) & 0x0E) >> 1)
927: #define IIR_FifoEnbd_udfRd     (((IIR_RgRd) & 0xC0) >> 6)

928: typedef enum eIntID {
929:             ModemStat   = 0x00,
930:             TxRegEmpty  = 0x01,
931:             TimeOut     = 0x06,
932:             RxDataAv    = 0x02,
933:             RxLineStat  = 0x03
934:             } eIntID;

935: #define GET_GLOBAL_INDICES(W_INDEX, R_INDEX)\
936:      disable_irq(4);\
937:      W_INDEX = g_write_index;\
938:      R_INDEX = g_read_index;\
939:      enable_irq(4)

940: #define SET_READ_INDEX(COUNT)\
941:      disable_irq(4);\
942:      g_read_index += COUNT;\
943:      enable_irq(4)

944: #define GET_TX_STATUS(FLAG) \
945:      disable_irq(4); \
946:      FLAG = gTxBuffEmpty; \
947:      enable_irq(4)

948: #define SET_TX_STATUS(STATUS) \
949:      disable_irq(4); \
950:      gTxBuffEmpty = STATUS; \
951:      enable_irq(4)
```

*FIG. 9*

```
1000a: static int gTriggerLevel;
1000b: int g_frequency = 1840000;
1000c: #define MAX_RETRY 5

1001: int config_baud_rate(t_baud_rate baud)
1002: {
1003:     int Divisor = g_frequency/(baud*16);
1004:     LCR_dlab_udfWr(TRUE);
1005:     DLL_dll_udfWr(Divisor&0x00ff);
1006:     DLM_dlm_udfWr((Divisor>>8)&0x00ff);
1007:     LCR_dlab_udfWr(FALSE);
1008: }

1009: int device_read(unsigned char *dest_ptr)
1010: {
1011:     if(1 == LSR_dr_udfRd())
1012:     {
1013:             *dest_ptr = RBR_RegRd;
1014:             return(0);
1015:     } else {
1016:             return(-1);
1017:     }
1018:}

1019: int device_write(char data)
1020: {
1021:     if (LSR_THRE_udfrd == 1)
1022:             THR_RgWr(data);
1023:}

1024:static isr_do_read()
1025:{
1026:     int Index;
1027:     for (Index = 0;Index < gTriggerLevel;Index++) {
1028:             if (g_write_index == 0) {
1029:                     device_read(&gRxDataBuff[0]);
1030:                     g_write_index++;
1031:                     continue;
1032:             }
1033:             device_read(&gRxDataBuff[g_write_index % MTU_SIZE]);
1034:             if((g_write_index + 1) == g_read_index) {
1035:                     g_read_index++; // informing the user about this overrun
1036:             }
1037:             if (g_write_index + 1 == 0) {
1038                     g_write_index %= MTU_SIZE;
1039:                     g_read_index %= MTU_SIZE;
1040:             }
1041:             g_write_index++;
1042     }
1043:}
```

*FIG. 10A*

```
1044: irqreturn_t ISR_HW(int irq, void *dev_id, struct pt_regs *regs)
1045: {
1046:     unsigned long flags;
1047:     int Intr_ID;
1048:     local_irq_save(flags);
1049:     if(IIR_IntPend_udfRd == Pending) {
1050:             Intr_ID=IIR_IntID_udfRd;

1051:             switch(Intr_ID)
1052:             {
1053:                 case RxDataAv:
1054:                         tasklet_schedule(&isr_read);
1055:                         break;
1056:                 case TxRegEmpty:
1057:                         gTxRegEmpty = EMPTY;
1058:                         break;
1059:                 default:
1060:                         break;
1061:             }
1062:     }
1063:     local_irq_restore(flags);
1064:     return IRQ_HANDLED;
1065:}

1066: static int register_ISR(irqreturn_t (*handler)( int, void *, struct pt_regs *), int IntrNo)
1067: {
1068:     if(request_irq(IntrNo, handler, SA_INTERRUPT, "yuart", NULL))
1069:             printk(KERN_INFO "yuart: can't get assigned irq %d\n",IntrNo);
1070:     else {
1071:             IER_erbfi_udfWr(TRUE);
1072:             IER_etbei_udfWr(TRUE);
1073:             IER_elsi_udfWr(TRUE);
1074:     }
1075:     return 0;
1076:}
```

SIMPLIFYING GENERATION OF DEVICE DRIVERS FOR DIFFERENT USER SYSTEMS TO FACILITATE COMMUNICATION WITH A HARDWARE DEVICE

RELATED APPLICATION(S)

The present application is related to and claims priority from the co-pending India Patent Application entitled, "Simplifying Generation Of Device Drivers For Different User Systems To Facilitate Communication With A Hardware Device", Serial Number: 2423/CHE/2006, Filed: Dec. 26, 2006, naming the same inventors as in the subject patent application, and is incorporated in its entirety herewith.

COMPUTER PROGRAM LISTING APPENDIX

Computer program listings are provided in electronic format, as permitted under 37 C.F.R. §1.52(e) and §1.96(c). The submitted compact disc, the contents of which is herein incorporated by reference, contains the following file: 11672515_Code_01072011.doc

BACKGROUND OF THE INVENTION

1. Field of the Invention

The present disclosure relates generally to simplifying generating software code, and more specifically to a method and apparatus for simplifying generation of device drivers for different user systems to facilitate communication with a hardware device.

2. Related Art

A device driver generally refers to a software code (group of software instructions), which enables a user system (e.g., a computer system) to interface with a hardware device (e.g., a printer, a modem, etc.). The device driver provides appropriate interfaces enabling various software modules (e.g., user applications, operating system components, etc.) executing in the user system (or hardware components in the user system) to communicate with and/or to control the hardware device.

Device driver code is different for different user systems generally due to differences in hardware and software characteristics among user systems. For example, different operating systems (or its absence) may require different software codes for operation as a device driver in the corresponding user systems. Similarly, having different hardware (devices, registers, etc.) characteristics may also require different software codes.

Given the large number of combinations of different user systems and operating environments (hardware and software characteristics), it is generally desirable that an efficient approach be provided to generate device drivers for different user systems to facilitate communication with a given hardware device.

BRIEF DESCRIPTION OF THE DRAWINGS

The present invention will be described with reference to the accompanying drawings briefly described below.

FIGS. 5A and 5B together depict a portion of a device specification in a formal language specifying the various hardware characteristics of a hardware device for which a device driver is to be generated in an embodiment.

FIG. 6A depicts a portion of a software specification in a formal language specifying the various characteristics of a runtime environment with no operating system for which a device driver is to be generated in an embodiment.

FIG. 6B depicts a portion of a software specification in a formal language specifying the various characteristics of a runtime environment with a Linux operating system for which a device driver is to be generated in an embodiment.

FIG. 7 depicts a portion of software instructions in a header file generated from a device specification in a formal language and a software specification in another formal language for a runtime environment with no operating system in an embodiment.

FIGS. 8A and 8B (henceforth conveniently referred to as FIG. 8) together depict a portion of software instructions in a code file generated from a device specification in a formal language and a software specification in another formal language for a runtime environment with no operating system in an embodiment.

FIG. 9 depicts a portion of software instructions in a header file generated from a device specification in a formal language and a software specification in another formal language for a runtime environment with a Linux operating system in an embodiment.

FIGS. 10A and 10B (henceforth conveniently referred to as FIG. 10) together depict a portion of software instructions in a code file generated from a device specification in a formal language and a software specification in another formal language for a runtime environment with a Linux operating system in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A device driver generator provided according to an aspect of the present invention receives a specification in a formal language indicating characteristics of a runtime environment of a user system, and forms instructions according to the characteristics such that the instructions can execute on the user system and enable a user application (executing in the user system) to communicate with the hardware device.

Developers can conveniently provide specifications representing respective run time environments and the device driver generator generates device drivers for the corresponding user systems.

According to another aspect of the present invention, the specification further contains a program logic according to a formal language specifying the manner in which external devices can communicate with the hardware device, and the device driver generator forms instructions incorporating the program logic according to the characteristics of the runtime environment.

Due to the use of a formal language in providing the specifications, the program logic portion of device drivers can be generated automatically for different user systems by software implementations.

According to one more aspect of the present invention, a designer of a hardware device provides the program logic and internal details of the hardware device according to a formal language. The task of generating device drivers for different environments is further simplified (for the developers of device drivers).

In an embodiment, the formal device specification is embedded in a datasheet (which also contains other details of the hardware device) of the hardware device, and a device driver generator may extract the information from the datasheet in generating the device drivers.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
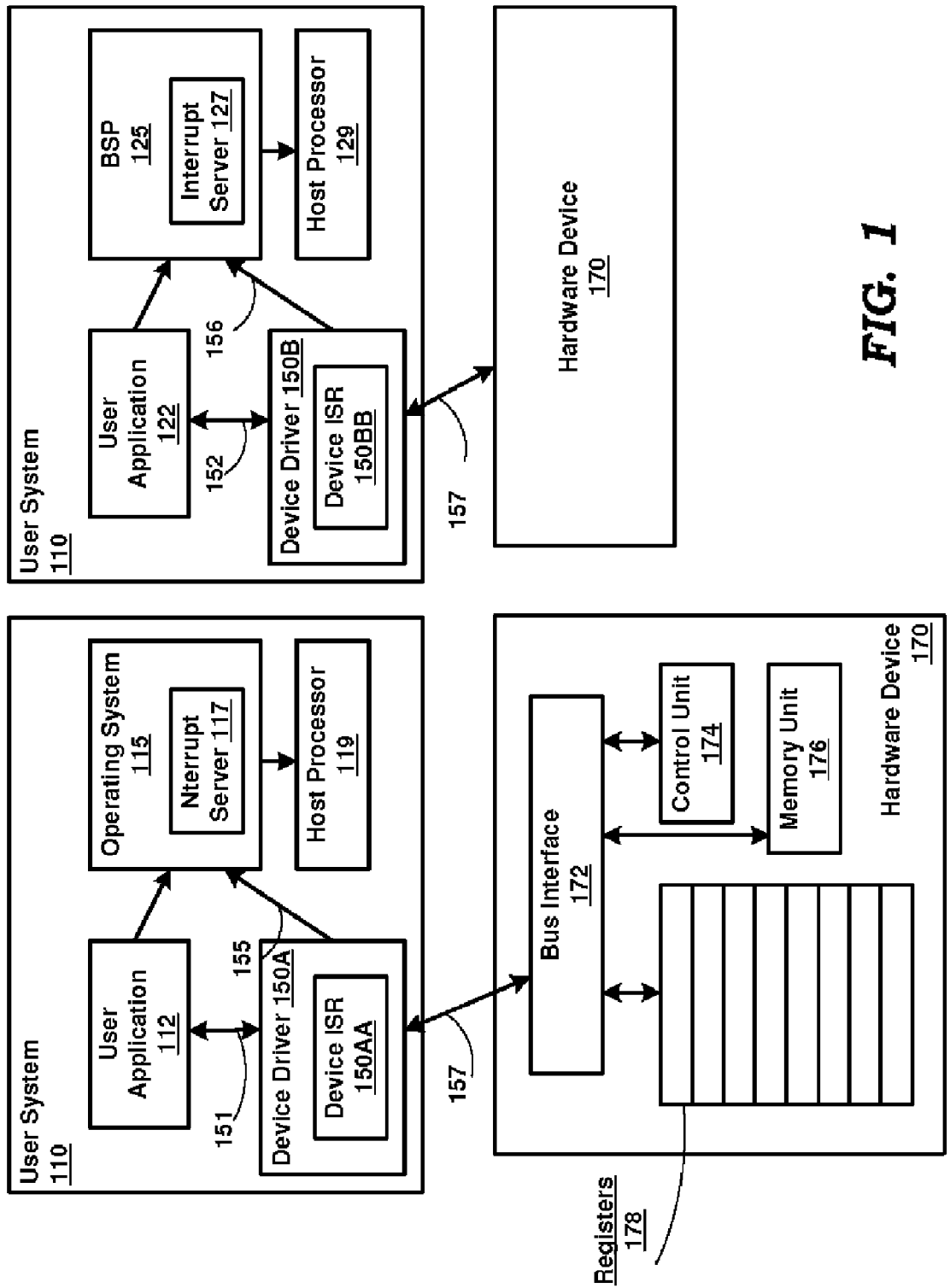
FIG. 1 is a block diagram illustrating the details of an example environment in which various aspects of the present invention can be implemented.

FIG. 1 is a block diagram illustrating the details of an example environment in which various aspects of the present invention can be implemented. The block diagram is shown containing user systems 110 and 120, and hardware device 170. User system 110 is shown containing user application 112, operating system 115 (containing BSP 116 which encapsulates the Interrupt Server 117), host processor 119 and device driver 150A (containing device ISR 150AA).

User system 120 is shown containing user application 122, Board Support Package (BSP) 126 (containing Interrupt server 127), host processor 129 and device driver 150B (containing device ISR 150BB). Hardware device 170 is shown containing bus interface 172, control unit 174, memory unit 176 and registers 178. Merely for illustration, only representative number/type of systems is shown in the Figure. Many environments often contain many more systems, both in number and type. Each system/device of FIG. 1 is described below in further detail.

Each user system 110 and 120 represents a system such as an embedded system, a personal computer, workstation etc., which may be used by a user to execute applications (such as user applications 112 or 122). User applications 112 and 122 represent applications that need to interface with hardware device 170 via device drivers' 150A and 150B respectively.

Host processors 119 and 129 represent hardware components that interpret instructions and process data contained in computer programs such as operating system 115 and user application 112. Operating system 115 facilitates the execution of user applications in user system 110 and is typically implemented as software instructions executing on the underlying hardware. BSP 125 is a library of platform specific routines that contain common functions that facilitates the execution of device drivers and is typically implemented as software instructions. The BSP may reside as part of an operating system or as a stand-alone module.

Interrupt server 117 and 127 represent software instructions (typically in BSP) whose execution is triggered by the reception of an interrupt. Device ISR 150AA and 150BB represent software instructions that need to be executed in response to the device interrupts. The interrupt server executes generic instructions for the particular processor and then calls the particular device ISR.

Hardware device 170 represents a hardware component for which the device driver is generated according to various aspects of the present invention. The device can be present inside the user systems though shown externally in FIG. 1. Bus interface 172 provides the physical/electrical and other protocol interfaces for connectivity between hardware device 170 and user systems 110 and 120. Bus interface 172 may be implemented using protocols such as RS-232, Memory mapping, IO Mapping, I2C, PCI, USB, I2S or SPI well known in the relevant arts.

Control unit 174 coordinates and controls the operation of other units of hardware device 170. Memory unit 176 may store any instructions and data necessary for the operation of control unit 174. Memory unit 176 may also store any temporary data during the operation of control unit 174. Accordingly memory unit 176 may contain units such as random access memory (RAM), EEPROM, etc.

Registers 178 represent a storage area for hardware input/output of different kinds between hardware device 170 and user systems 110 and 120. In addition, registers 178 may store configuration data, which controls the operation of hardware device 170 during operation, initialization, and status reporting such as whether a certain event has occurred in the hardware device. It may be appreciated that though hardware device 170 is shown containing specific units, other hardware devices may contain only some of the units or may contain other types of units.

Device drivers 150A and 150B represent software instructions, typically developed to facilitate various software modules (e.g., user applications 112 and 122) executing respectively within user systems 110 and 120 to communicate with and/or control hardware device 170. As may be appreciated, the software instructions may depend on execution environment (i.e., operating system, BSP, processor, other hardware components, etc.) provided internally, and is hereafter referred to as a runtime environment. The software instructions depend on various other aspects as well, as can be appreciated by understanding the details of an example device driver described below.

3. Details of a Device Driver

Figure 2:
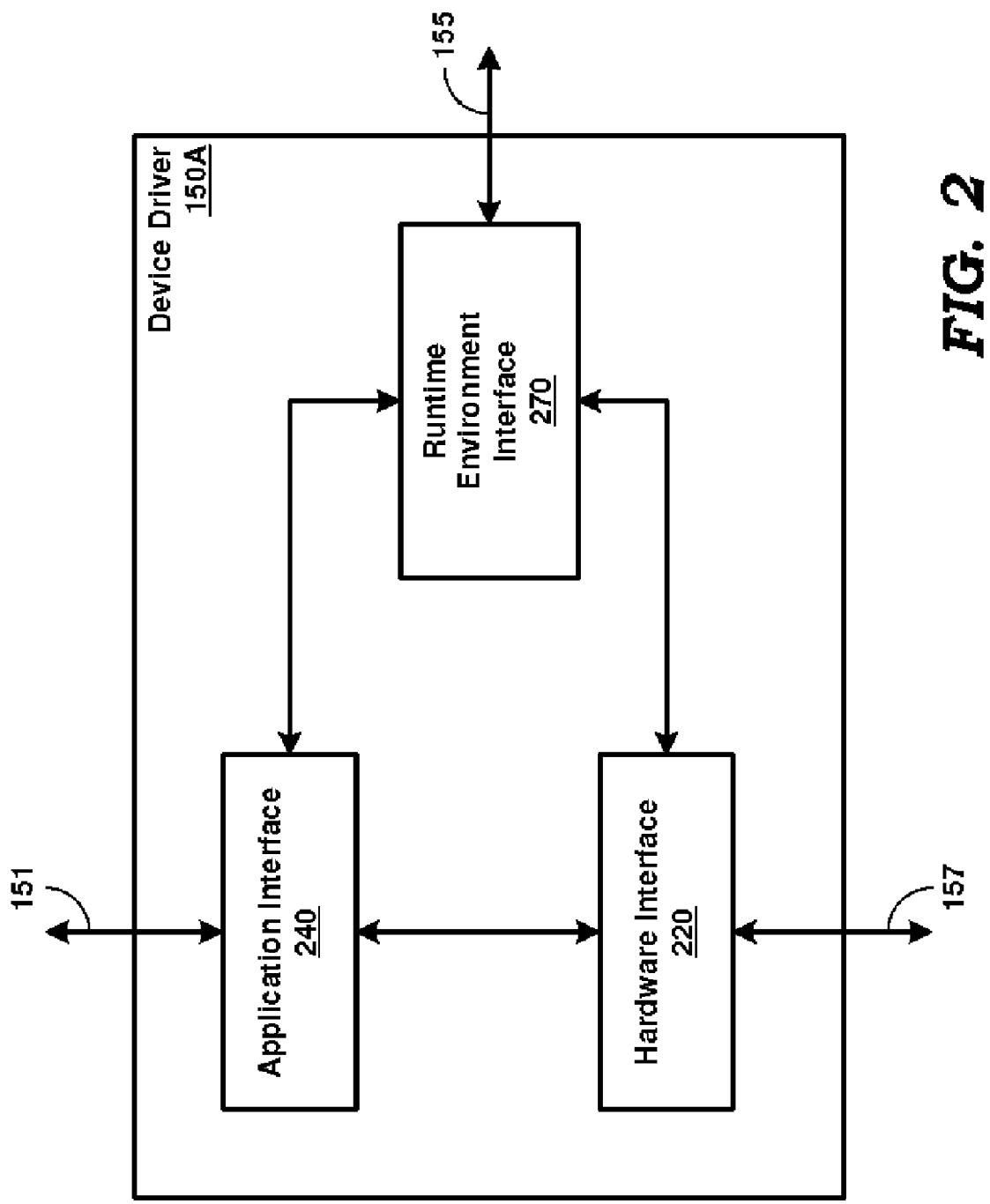
FIG. 2 is a block diagram illustrating the details of a device driver in one embodiment.

FIG. 2 is a block diagram illustrating the details of a device driver (device driver 150A) in one embodiment. The block diagram is shown containing hardware interface 220, application interface 240 and runtime environment interface 270. Each of the blocks is described in detail below.

Hardware interface 220 represents instructions designed to provide access to (and communicate with) the various components (usually hardware, but can be, for example, executing software modules) within hardware device 170 (via 157). The instructions may enable writing of data to desired registers 178 and in general for effecting desired change of states in hardware device 170. For example, when user application 112 requests a high level task (e.g., to transmit a byte of data using a UART device), hardware interface 220 may send a series of necessary commands to initialize various registers 178, have control unit 174 to facilitate the reception of data and store the same in memory unit 176.

Application interface 240 represents instructions that may be invoked from an application (such as user application 112 via 151) for accessing the various features of hardware device 170. Each subset of instructions is identified by corresponding names, which are used to invoke the subset of instructions.

The names may be provided by a user or may be generated to comply with pre-defined standards (where names are pre-defined).

Runtime environment interface 270 represents instructions that provide communication with the runtime environment in which modules seeking to communicate with hardware device 170 are executed. The instructions in runtime environment interface 270 are used for facilitating communication between hardware device 170 and the various hardware components of user systems.

Various aspects of the present invention enable the device drivers to be generated efficiently for different runtime environments. The advantages will be clearer by considering some prior approaches to generating device drivers. Accordingly, the description is continued with respect to the manner in which device drivers are generated for various runtime environments in some prior approaches.

4. One Prior Approach to Creation of Device Drivers

In one prior embodiment, a hardware designer (who designs the hardware device) provides a data sheet (often times paper or electronic text/document) specifying various characteristics of the hardware device, in addition to describing in some non-formal language (e.g., written English) the manner in which external devices can communicate with the hardware device. As is well known in the relevant arts, non-formal languages can have ambiguity in the syntax/semantics, thereby not generally lending to machine interpretation.

A device driver developer (person) then reads the data sheet and implements the software instructions forming the device drivers, specifically hardware interface 220. In general, the developer provides a fixed application interface 240 for interfacing with user applications.

The developer generally needs to be aware of the various characteristics of the runtime environment for creating runtime environment interface 270, for which the device driver is to be created.

Due to such manual effort and reliance on developer skills, creating the device drivers for different runtime environments often turns out to be a onerous and expensive experience. Various aspects of the present invention enable the devices drivers to be generated efficiently as described below.

5. Inventive Approach to Generate Device Drivers

Figure 3:
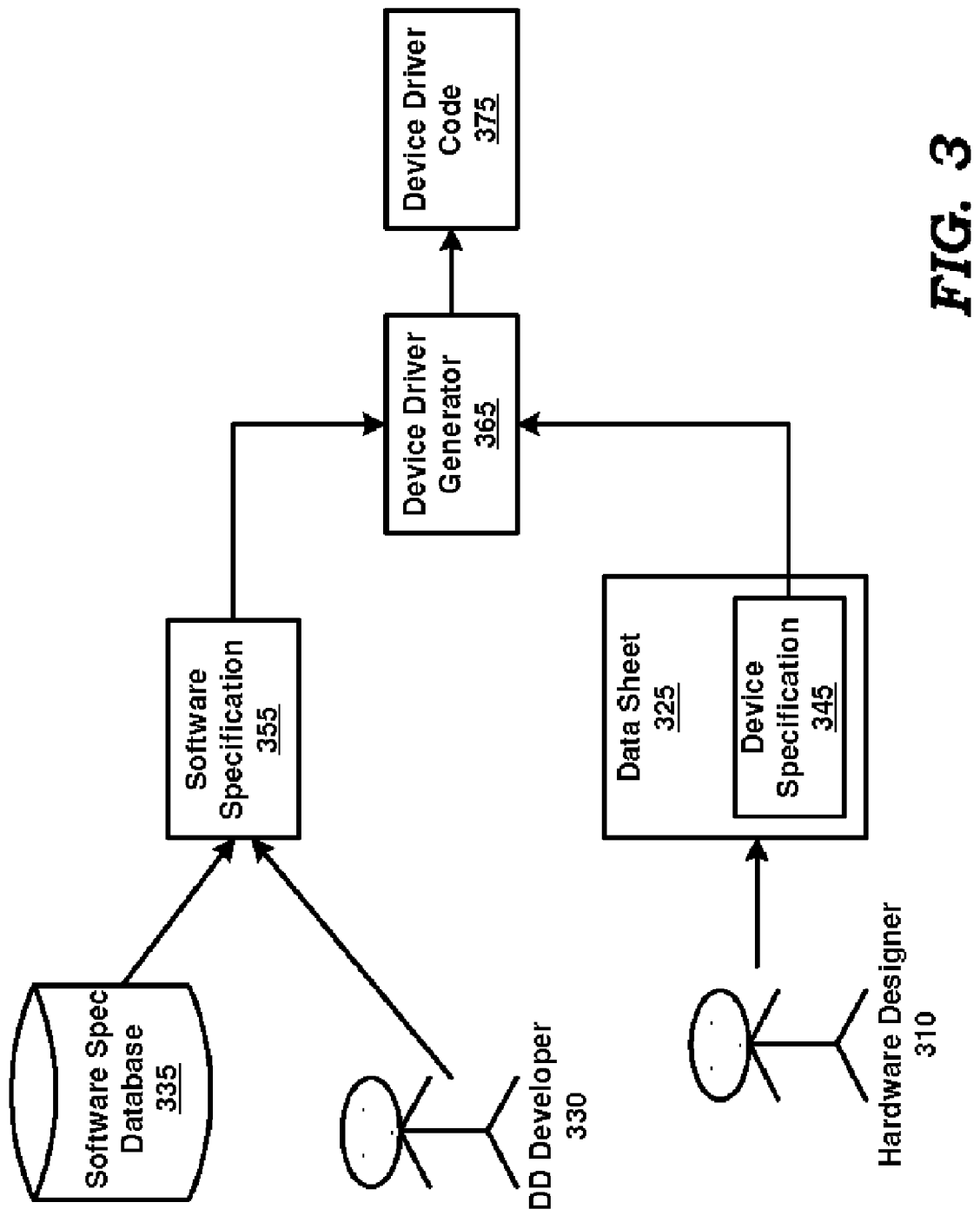
FIG. 3 is a diagram illustrating the generation of a device driver according to an aspect of the present invention.

FIG. 3 is a diagram illustrating the generation of a device driver according to an aspect of the present invention. The diagram is shown containing hardware designer 310, data sheet 325, device driver developer 330, software specification database 335, device specification 345, software specification 355, device driver generator 365, and device driver code 375. Each of the blocks is explained in detail below.

Hardware designer 310 (person) designs the architecture of a hardware device (for which a device driver is to be generated) such as the number of registers, the memory used and program logic using which external devices can communicate with the target hardware device. The program logic may specify the manner in which status information (e.g., from a register indicating the status of a pending interrupt) can be retrieved, the manner in which data can be written to various components in the hardware device, and sending/receiving a sequence of data elements. The communication can thus form the basis for controlling the hardware device and/or specifying the various states of the hardware device, the actions that need to be performed for the hardware device to undergo a desired change of state and the manner in which such changes of states are effected.

According to an aspect of the present invention, hardware designer 310 includes the identifiers of registers, details of program logic for communicating with hardware device 170 according to a pre-specified formal language (having a non-ambiguous syntax/semantics, thereby lending to machine processing). The information is referred to as device specification 345, which may also contain other information (e.g., version number, manufacturer name, etc.) about the hardware device.

As the program logic and register information is consistent with pre-specified formal language, device driver generator 365 (software code) may be designed to parse the contained information and generate software instructions (constituting hardware interface 220) consistent with the language specification, as required for implementation in the runtime environment.

According to another aspect of the present invention, the program logic, the register information and other characteristics of the hardware device are embedded in datasheet 325 in electronic form and device driver generator 365 extracts the embedded information while generating the device drivers.

As may be appreciated, the instructions contained in the device driver (constituting runtime environment interface 270) would depend on the various characteristics of the runtime environment. Accordingly, according to another aspect of the present invention, device driver developer 330 may provide software specification 355 containing information about various characteristics of the runtime environment in which a user application needs to communicate with the hardware device.

Software specification 355 is also specified in a formal language (may be similar to/different from the formal language used for device specification 345) to remove ambiguity in specifying the characteristics of the environment. Software specification database 335 stores the various software specifications created by device driver developer 330. The software specifications may be used to generate runtime environment interface 270, in addition to hardware interface 220.

According to another aspect of the present invention, device driver developer 330 may also specify the manner (name and access approach) in which applications (executing in the runtime environment) access the various features of the device driver (corresponding to application interface 240). In the embodiment described below, the manner in which applications access various features of the device driver is specified in software specification 335 in the formal language. As such, software specification 355 is used to generate application interface 240 as well.

Device driver generator 365 (provided according to an aspect of the present invention and implemented in the form of a computer implemented utility) receives device specification 345 (embedded in data sheet 325) and also software specification 355 (either from device driver developer 330 or from software specification database 335) and generates the software instructions contained in device driver code 375. The manner in which device driver generator 365 generates instructions constituting a device driver from a formal language specification is described in detail below.

6. Generation of a Device Driver

Figure 4:
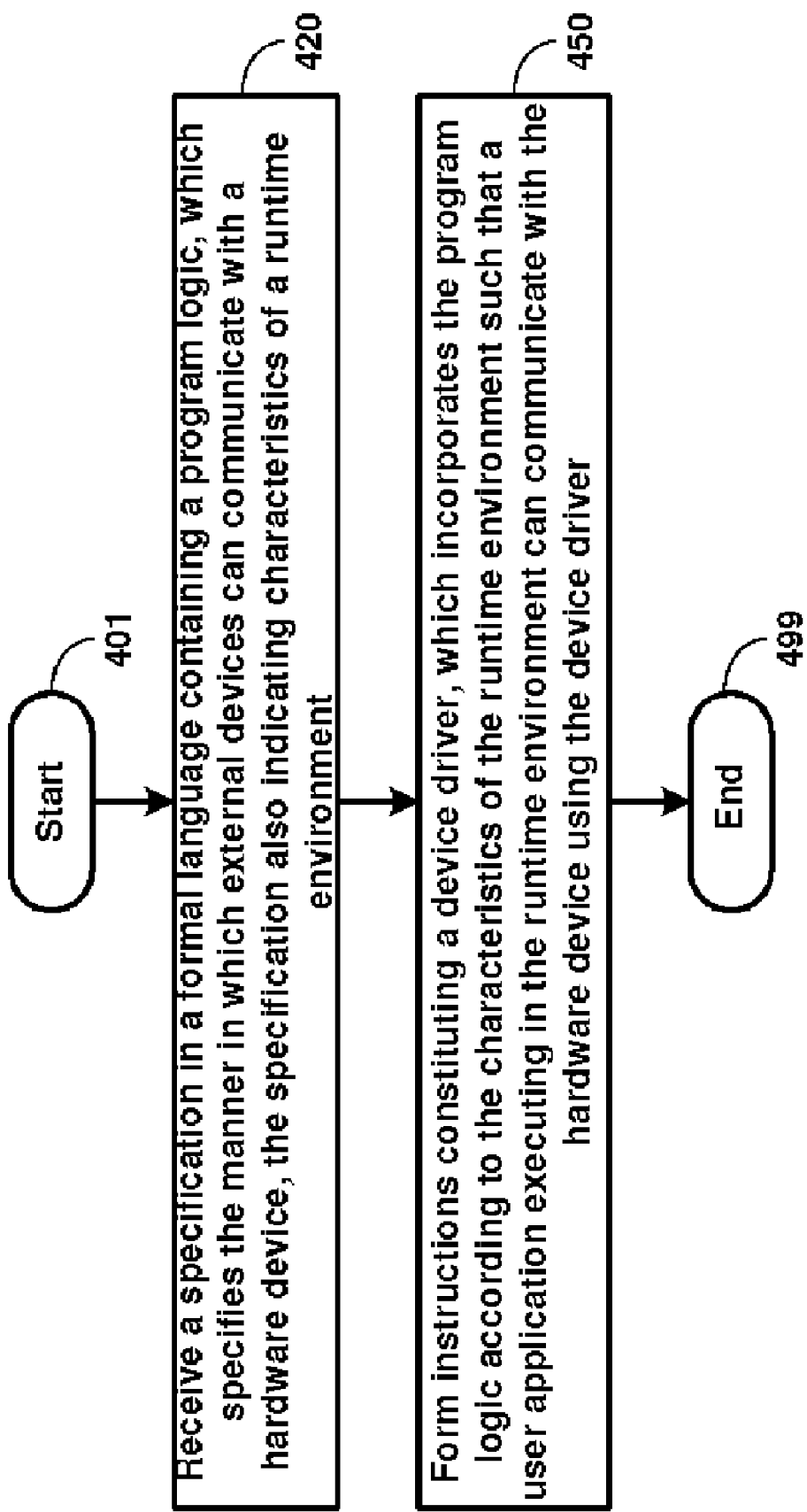
FIG. 4 is a flowchart illustrating the manner in which a device driver is generated from a formal language specification according to various aspects of the present invention.

FIG. 4 is a flowchart illustrating the manner in which a device driver is generated from a formal language specification according to various aspects of the present invention. The flowchart is described with respect to FIG. 3 merely for illustration. However, various features can be implemented in other environments also without departing from the scope and spirit of various aspects of the present invention, as will be apparent to one skilled in the relevant arts by reading the disclosure provided herein. The flow chart begins in step 401, in which control immediately passes to step 420.

In step 420, device driver generator 365 receives a specification in a formal language containing a program logic, which specifies the manner in which external devices can communicate with the target hardware device. Some aspects of the communication may assist in controlling the hardware device, while other aspects may cause a desired change of state in a hardware device. The specification also contains characteristics of a runtime environment. The specification may contain multiple parts, for example, a device specification specifying the program logic, and a software specification specifying the characteristics of the runtime environment. The software specification also may specify the manner in which application may access the various features of the device driver.

In step 450, device driver generator 365 forms instructions constituting a device driver, which incorporates the program logic according to the characteristics of the runtime environments such that a user application executing in the runtime environment can communicate with the hardware device using the device driver. Device driver generator 365 forms instructions constituting hardware interface 220 by incorporating the program logic for communication with the hardware device. Instructions constituting application interface 240 and runtime environment interface 270 are formed based on the characteristics of the runtime environment specified in the specification. The flow chart ends in step 499.

It may be appreciated that instructions constituting the various interfaces in the device driver can be formed from the received specification by device driver generator 365, thereby potentially generating a complete device driver (capable of communicating with the hardware device) programmatically. The description is continued with an illustrative example illustrating the manner in which a device driver is generated from a formal language specification.

7. Illustration

FIGS. 5A, 5B, 6A, 6B, 7A, and 7B together illustrate the manner in which instructions constituting a device driver are generated from a formal language specification in an embodiment. Each of the figures is described in detail below.

In the embodiment described below, the specification is provided in the form of a device specification specifying the characteristics of a hardware device and a software specification. The software specification specifies the various characteristics of the runtime environment for which the device driver is to be generated for communicating with the hardware device. As may be appreciated, in alternative embodiments, a single specification may be provided containing the information included in the device and software specifications as will be apparent to one skilled in the relevant arts.

Broadly, the formal language used for specifying the information in the below figures enforces syntax on the information that may be presented. The information may be identified using pre-specified words called keywords. The formal language specifies the possible values (or the types of values) for each of the keywords. Also, the formal language specifies the keywords that are required and must be provided (while also indicating the keywords that may be optional).

8. Device Specification

FIGS. 5A and 5B together depict a portion of a device specification in a formal language specifying the various hardware characteristics of a hardware device (Part UART PC16550D available from National Semiconductor Corporation) for which a device driver is to be generated in an embodiment. A more comprehensive listing of the device specification is included as Appendix A.

Lines 511-513 depict the various identification details of the hardware device such as device_name ("pc16550D"), manufacturer_name ("National Semiconductors") and device_version ("NONE").

Lines 521-530 depict the various data registers (as indicated by the keyword "DATA_REGISTERS") available in the hardware device. Lines 522-525 depict a single data register with name "RBR", size as 8 bits (as specified by the number in the square brackets "[8]") and with offset of 0 (as specified by the number "0" after the "@" symbol). The data register "RBR" is also specified to be a read only register as depicted in line 523, where type is specified as "RO" (read only access restriction). Line 524 indicates that the data register "RBR" is to have a value of "0" when the register is reset as specified by "value_on_reset" ("0"). Similarly, lines 526-530 depict another data register with name "THR", size as 8 bits, offset as 0, as a write only ("WO" in line 527) register and with "0" value on reset.

It should be appreciated that the above description is based on an understanding of the syntax and semantics of the formal language. For conciseness, terms such as keywords, syntax and semantics are not repeated in the description below, however the context of such terms will be apparent to one skilled in the relevant arts by reading the disclosure provided herein.

Lines 531-564 depict the various interrupt registers (as indicated by the keyword "INTERRUPT_REGISTERS") available in the hardware device. Lines 532-563 depict a single interrupt register with name "IIR", size of 8 bits, offset as 2 and of type read only. Lines 534-538 depict a definition of a user-defined field (keyword "udf") with name "IntPend" for the bit 0 (as specified by the construct "<0:0>" specifying the start bit index as "0" and end bit index as "0"), having access type as read only, access mode as "DC" that is "Don't Care" (in line 536) and that value on reset as "0" (in line 537).

User defined fields enable a user to refer to the various bits in a register by descriptive names (instead of indices) in the instructions constituting the device drives. Similarly, lines 539-551 and lines 553-562 depict user-defines fields with names "IntID" and "FifoEnbd" respectively. In line 552, a keyword "RESERVED" is used to specify bits that cannot be accessed by the user applications directly or to specify bits that may be reserved for future use.

Lines 543-550 depict various user-defined constants (as specified by the keyword "udconst") defined for the user-defined field "IntID" (as specified in line 544). The names of the constants (such as "ModemStat" and "TimeOut") and their corresponding values ("'h00" and "'h06") are depicted in lines 545-549. The values are specified as hexadecimal values (as specified by "h"). User defined constants enable a user to specify values for user-defined fields by constant names rather than specifying the actual value of the bits in the user-defined fields. Similarly, lines 557-561 depict another set of user-defined constants specified for the user-defined field "FifoEnbd" with the name "fifo_enabled".

It may be appreciated that various other types of registers may also be available in the hardware device. As such the specification enables specifying various other types of registers such as control registers ("CONTROL_REGISTERS"), status registers ("STATUS_REGISTERS") and general purpose registers ("GP_REGISTERS").

Lines 565-573 depict program logic (specified by the keyword "feature") for communicating with the hardware device. The program logic or feature is specified as having name "configure_baud_rate" and takes an input value "baud" of type "t_baud_rate" (as specified in line 566 using the keyword "input"). In line 567, a local variable "Divisor" is specified (using the keyword "local"). In line 568, the value of the local variable "Driver" is updated with the value of the expression "$bsp_spec.dev_frequency/(baud*16)".

The "$" symbol in the variable "$bsp_spec.dev_frequency" signifies that that variable value is to be retrieved from the software specification (of the runtime environment, as can be seen in line 634 of FIG. 6A and line 684 of FIG. 6B) and/or to be specified by a user. In lines 569-572, various registers are configured with the values calculated based on the input value.

Similarly lines 574-579 and 580-583 depict program logics or features with names "device_read" and "device_write" specifically. It may be observed that in line 575, an output value "dest_ptr" (as specified by the keyword "output") may also be specified for a feature. It should be appreciated that only example program logics for obtaining corresponding communication are described in the Figures for illustration. However, typical devices would require more extensive logic for the corresponding hardware devices, as would be apparent to one skilled in the relevant arts by reading the disclosure provided herein.

Lines 584-588 specify the interrupts (keyword "interrupt_spec") associated with the hardware device. The specification is used to generate software instructions constituting the device ISRs (such as 150AA and 150BB) during the generation of the corresponding device driver code.

In line 585, the location that is the user defined field in a register "IIR.IntPend" (depicted in line 534) that is to be checked for pending interrupts is specified (using the keyword "Interrupt_Pending"). Lines 586a-586f specifies the details of an interrupt associated with the hardware device. In line 586a, a user defined constant "IIR.IntID.TxRegEmpty" (depicted in line 546) is used as the name of the interrupt. Line 586b-586e specify the manner in which the interrupt may be enabled (keyword "Enable"), may be disabled (keyword "Disable"), may be cleared (keyword "Clear") and the feature that may be associated with the interrupt (keyword "Feature"). Similarly, lines 587a-587f specify the details of another interrupt (with name "IIR.IntID.RxDataAv") associated with the hardware device.

Lines 589-593 specify the details of a FIFO (first in first out) that is a buffer used for temporary storage during the communication between the device driver and the hardware device. In line 590, the user defined field of a register using which a buffer may be enabled is specified (using keyword "fifo_enable"). In line 591, the size of the buffer is specified (using keyword "fifo_size"). In line 592, the number of locations (in the buffer) after which a buffer is read/written is specified as a resize of the buffer (using keyword "fifo_resize").

It should be appreciated that only example interrupt/buffer specification are described in the Figures for illustration. Typical hardware devices would require more interrupt specification and/or different types of buffers. Similarly, the specification could include several other types of information. Some of such types of information (e.g., error specification) and program logics are shown in Appendix A.

The description is continued with respect to software specification (specifying the characteristics of the runtime environment), which is also used in generating device drivers in an embodiment of the present invention.

9. Software Specification

FIG. 6A depicts a portion of a software specification in a formal language specifying the various characteristics of a runtime environment with no operating system (user system 120) for which a device driver is to be generated in an embodiment. In line 605, the operating system (keyword "os") is specified as "no" indicating that the environment does not have an operating system and contains only a board support package (BSP). Lines 608-611 specify the manner in which the registers in the hardware device are to be accessed by the device driver (as specified by the keyword "device_register_access"). In line 609, the type of access (keyword "type") is specified to be "memory_mapped" indicating that the registers in the hardware device can be accessed as memory locations (that is by specifying a address corresponding to each register). In line 610, the start address of the memory mapping (keyword "address") is specified as "0x8000".

Lines 612-619 depict the details of the host processor (as specified by the keyword "processr_spec") in the runtime environment. In line 613, the name (keyword "name") of the host processor is specified ("80186"), which determines the manner in which the BSP instructions constituting runtime environment interface 270 is to be generated in the scenario where the runtime environment does not provide such an interface. In line 614, the clock speed (keyword "clock_speed") of the processor is specified ("100M") which is used for timing calculation in the scenario where the hardware device needs to be polled for information from the device driver.

In line 615, the manner in which bits are indexed (keyword "endian") is specified ("little"), signifying that the bits are to be indexed with index 0 specifying the least significant bit. The indexing manner may be required for generating instructions for accessing registers in hardware interface 220. In line 616, the number of bits in a word (keyword "word_length") is specified ("16") determining the manner in which user applications interact with the device driver via application interface 240.

In line 617, the manner in which memory management is done (keyword "mmu") is specified ("no"), indicating that the processor performs no memory management. In the scenario where the specified value equals "yes" signifying the presence of direct memory access (DMA), the device driver may contain instructions to translate the virtual addresses to actual physical addresses when accessing memory in the user system. In line 618, the manner in which memory address are maintained (keyword "address") is specified ("flat") indicating that the memory address is numbered sequentially and appropriate calculations need to be performed for accessing memory in the user system.

Lines 620-626 depict details about the manner in which user applications interface with the device driver. The details are used to generate the instructions constituting application interface 240. The instructions in application interface 240 provide access to subset of instructions in the device driver by corresponding names. In general, the various values that may be permitted for the various keywords in these lines are dependent on the programming language in which the device driver generator is to be generated.

Lines 620-623 depict the manner in which the names are to be generated (keyword "entry_point"). In line 621, the manner in which the names are to be generated (keyword "entry_point") is specified ("USER_SPECIFIED"). The value "USER_SPECIFIED" indicates that the names are to be specified by a user during the generation of the device driver. In line 622, the manner in which data is to be handled (keyword "entry_point_qualifier") is specified ("blocking"). The value "blocking" indicates that the device driver must wait for a pre-specified size of data before proceeding with the processing of the data.

In line 624, the manner in which the names are to be accessed (keyword "call_conv") is specified ("direct"). The value "direct", indicates that a user application accesses the names as direct calls to functions as is well known in the relevant arts. In the scenario where the value is "message", there is no direct linkage between the user application and the device driver. The device driver and the user application execute as independent processes (that are executed simultaneously) with communication between the processes being performed using messages in a pre-specified format. The user application process sends messages to the device driver thread indicating the functions to be executed. The messages are queued and executed by the device driver process. The device driver code needs to reflect such operation.

In line 625, the manner in which functions mutually call each other (keyword "re_entrancy") is specifed ("disable_interrupt"). Appropriate instructions are generated based on the value of the keyword "re_entrancy". In line 626, the manner in which registers are accessed from user applications (keyword "io_reg_declaration") is specified ("hash_defines"). The value "hash_defines" indicates that the instructions for accessing registers in the hardware device are to be generated as macros (well known in C, the programming language in which device driver is to be generated).

Lines 627-632 depict the manner in which the device driver is to interact with the interrupt service routine (ISR) in the runtime environment (keyword "isr_spec"). In line 628, the type of the ISR (keyword "isr_type") is specified ("single") determining the manner in which the instructions in runtime environment interface 270 is to be generated for the device driver to interface with the ISR. In line 629, the manner in which synchronization of communication between the device driver and the ISR (keyword "isr_comm") is specified ("global_var"). The value "global_var" indicates that the communication between the device driver and the ISR is to be synchronized using global variables.

Line 630 specifies ("no") whether the device driver needs to maintain an independent interrupt stack (keyword "interrupt_stack"). If the value is "yes", the device driver needs to create an interrupt stack, register the interrupt stack with the runtime environment (typically an operating system) and use the interrupt stack appropriately. In line 631, the interrupt request (IRQ) number for the hardware device (keyword "interrupt_number") is specified ("4"). The IRQ number enables a device to "interrupt", or send a signal to the host processor indicating that the device driver has finished processing. In general, the IRQ number is used to register the ISR with the operating system to enable the operating system to call the ISR when an interrupt associated with the hardware device is generated. Interrupts are generated in the scenario where the hardware device completes processing, or when processing needs to be done by the operating system or when an error has occurred during processing.

Lines 633-640 depict the manner in which the device driver is to interact with a BSP in the runtime environment (keyword "bsp_spec"). In line 634, the frequency in which the BSP operates (keyword "dev_frequency") is specified ("1.84M"), the value determining the manner in which appropriate instructions for interfacing with the BSP (constituting runtime environment interface 270) are generated. Lines 635-639 depict commented out portions of the specification (thereby will not be effective) that specify the various names of the functions that are to be used by the device driver to save/restore context, enable/disable interrupt, register interrupt etc. In the scenario where the functions are not specified (indicating that the BSP does not provide the functions), the device driver generator generates appropriate instructions for the above functions.

Lines 641-643 depict the manner in which the device driver needs to handle any errors during execution of the instructions (keyword "error_handling"). In line 642, the number of attempts to retry an operation if the operation generates an error (keyword "retry") is specified ("5"). Appropriate instructions are generated to ensure that operations that generate an error are retried (after an appropriate time interval) before indicating failure.

FIG. 6B depicts a portion of a software specification in a formal language specifying the various characteristics of a runtime environment with a Linux operating system (user system 110) for which a device driver is to be generated in an embodiment. It may be observed that lines 658-661, 662-670, 672-677 and 679-693 in 6B are similar to lines 608-611, 612-620, 622-627 and 629-643 in FIG. 6A and their explanation is not presented for conciseness.

In line 655, the operating system (keyword "os") is specified as "linux" indicating that the runtime environment is a Linux operating system. In line 671, the manner in which the names are to be generated (keyword "entry_point") is specified as "POSIX". The value "POSIX" indicates that pre-specified names are to be used for representing corresponding subset of instructions in the device driver. In line 678, the type of the ISR (keyword "isr_type") is specified as "split" indicating that the ISR processes different interrupts with different priorities and device driver must contain appropriate instructions for interfacing with the ISR appropriately. It may be appreciated that a "split" ISR is possible only in the scenario when an operating system is present and the operating system supports a "split" ISR implementation.

The manner in which device driver generator 365 generates device drive code from the device specification of FIGS. 5A and 5B and the software specification of FIG. 6A is described next.

10. Forming Device Driver Instructions

FIG. 7 depicts a portion of software instructions in a header file generated from a device specification (of FIGS. 5A and 5B) in a formal language and a software specification (of FIG. 6A) in another formal language for a runtime environment with no operating system in an embodiment. A more comprehensive listing of the header file is included as Appendix B1.

Line 701 depicts the start of the memory addresses that is used as the reference for specifying the various offsets of the registers. The value is based on the specification depicted in lines 608-611 (specifically line 610 where the start address is specified as "0x8000"). Lines 702-708 depict the various data registers in the hardware device and are generated based on the specification depicted in lines 521-530. In lines 702-704, the instructions generated provide read-only access restriction to the register "RBR" as specified in line 523 ("RO" for keyword "type"). Similarly, in lines 705-708, the register "THR" has write-only access as specified by line 527.

It may be observed that the instructions generated for accessing the various registers are in the form of macros (using the keyword "#define") based on the software specification ("hash_defines") for the keyword "io_reg_declaration" as depicted in line 626.

Lines 709-717 correspond to instructions generated for interrupt register "IIR" based on the specification depicted in lines 531-564. In line 709, the offset value used is "2" corresponding to the "2" specified in line 532. It may be observed the start memory address is specified as a value in line 701 and the offset is added to the value to obtain the memory address corresponding to the register "IIR". The memory address calculation is so generated due to the specification "no" for the keyword "mmu" in line 617 signifying that no memory management is being used by the runtime environment.

Line 711 corresponds to the user-defined field "IntPend" specified in lines 534-538, the mask "0x01" and the number of bits by which the value is to be shifted "0" is based on the start bit index specified in line 534. Similarly lines 716 and 717 correspond to the user-defined fields "IntID" and "FifoEnbd" specified in lines 539-551 and 553-562 with the appropriate masks "0x0E" and "0xC0" and with the number of bits shifted as "1" and "6" respectively.

Lines 718-724 correspond to instructions generated for user-define constants for the user-defined field "IntID" as depicted in lines 543-550. The various constants are specified as part of a enumerated constant (keyword "enum") and are accessible using the type (keyword "typedef") name "eIntID".

Lines 725-743 depict macros that are part of a template code for the implementation of a circular queue used for synchronization between interrupts (ISR) and the device driver. The instructions are generated based on the value of the keyword "os". As such, for a value "no" for the keyword "os" as depicted in line 605, the instructions are generated for a runtime environment with no operating system. Also, the manner in which synchronization is performed is based on the specification "disable_interrupt" for keyword "re_entrancy" depicted in line 625. As such, synchronization is performed by disabling interrupts before performing an operation and enabling the interrupts after performance of the operation.

In lines 725-726, macros "di( )" and "ei( )" are defined for the assembly instructions for disabling interrupts and for enabling interrupts respectively for convenience. The assembly instructions corresponding to disabling and enabling of interrupts are identified based on the specification "80186" for keyword "name" in "processor_spec" as depicted in line 613. In lines 728, 733, 737 and 741, the macro "di( )" is used to disable interrupts and in lines 731, 735, 739 and 743, the macro "ei( )" is used to enable interrupts.

FIG. 8 (combination of FIGS. 8A and 8B) depicts a portion of software instructions in a code file generated from a device specification (of FIGS. 5A and 5B) in a formal language and a software specification (of FIG. 6A) in another formal language for a runtime environment with no operating system in an embodiment. The complete listing of the code file is included as Appendix B2. It may be appreciated that appropriate instructions (like the command "#include") may be generated in the code file to include (that is physically incorporate) the software instructions in the header file into the portion of software instructions present in the code file.

It may be observed that the instructions in the device driver are specified as functions with a corresponding name. The functions are generated based on the software specification "USER_SPECIFIED" for the keyword "entry_point" in lines 620-623. During the generation of the instructions, a user may be prompted with the names of the functions generated, thereby enabling the user to modify the names of the functions as desired.

Lines 800a-800c depicts the definition of global variables that may be used in the rest of the software instructions in the device driver. In line 800a, a global variable with name "gTriggerLevel" is defined and represents the number of characters in the FIFO/buffer contained in the hardware device (as specified by lines 589-593). In line 800b, a global variable with name "g_frequency" is initialized with the value "1840000" of the BSP frequency as specified in line 634. In line 800 a macro "MAX_RETRY" is defined as the maximum number of repetitions that an operation must be performed when an error is determined. The value "5" corresponds to the value specified for keyword "retry" in the "error_handling" section depicted in lines 641-643.

Lines 801-808 depict a function that corresponds to a feature of the hardware device (as specified in lines 565-573). It may be observed that the parameter ("baud" of type "t_baud_rate") of the function corresponds to the input (keyword "input") specified in line 566. Also, the equation in line 803 is a translated version of the equation corresponding to lines 567-568 with the value of "$bsp_spec.dev_frequency" (in line 568) replaced with the corresponding value (stored in a global variable named "g_frequency" in line 800b) from the software specification "1.84M" for the keyword "frequency" in "bsp_spec" depicted in line 634.

It may further be observed that the various register operations in lines 804-807 correspond to the various register operations specified in lines 569-572. Similarly, lines 809-818 and lines 819-823 depict functions (with names "device_read" and "device_write") that correspond to the specification depicted in lines 574-579 and 580-583 respectively.

Lines 824-860 depict a function (name "ISR_SW") for interfacing with the ISR in the runtime environment when a software interrupt is to be handled. The instructions in the function are generated based on the interrupt specification (depicted in lines 584-588) in the device specification for the hardware device. In line 827, the value of a user defined field in a register in the hardware device is read using the macro "IIR_IntPend_udfRd" to check for pending interrupts corresponding to the specification in line 585. Similarly, lines 832-852 (for the interrupt "RxDataAv" as specified in line 832) and lines 853-855 (for the interrupt "TxRegEmpty" as specified in line 853) are generated corresponding to the interrupts specified in lines 586a and 587a.

Lines 861-869 and lines 870-879 depict functions for handling hardware interrupts ("ISR_HW") and for registration of interrupt handlers ("register_ISR") respectively. It may be observed that the function "ISR_HW" directly invokes the function "ISR_SW", since the ISR is specified as "single" for keyword "isr_type" in line 628. It may be observed that in both the functions, the interrupts are disabled and enabled using the macros "di( )" and "ei( )" defined in lines 725-726.

Lines 880-888 and lines 889-897 depict functions (named "SaveContext" and "RestoreContext") for handling the interface with the BSP in the runtime environment. The functions are generated as there is no operating system (as specified in line 605) and no BSP function names have been specified in lines 635-639. It may be observed that the functions contain assembly instructions that correspond to the processor "80186" specified in line 613.

FIG. 9 depicts a portion of software instructions in a header file generated from a device specification (of FIGS. 5A and 5B) in a formal language and a software specification (of FIG. 6B) in another formal language for a runtime environment with a Linux operating system in an embodiment. The complete listing of the header file is included as Appendix C1.

Lines 901-902 depict various files (named "asm/irq.h" and "linux/interrupt.h") containing software instructions that are to be included. The files that are included are based on the operating system (keyword "os") specified in the software specification ("linux" in line 655). It may be observed that lines 911-934 are exactly similar to lines 701-724 and are generated similarly as explained above.

Lines 935-951 are similar to lines 725-743, but differ in the manner in which interrupts are disabled and enabled. It may be observed that synchronization is performed using interrupts as specified in line 675. Since the operating system is specified as "linux" in line 655, corresponding Linux specific functions are invoked to disable and enable interrupts. In lines 936, 941, 945 and 949, the interrupts are disabled by invoking "disable_irq(4)", where "4" signifies the IRQ number as specified in line 681 for the keyword "interrupt_number". In lines 939, 943, 947 and 951 the interrupts are enabled by invoking "enable_irq(4)". It may be appreciated that files included corresponding to the operating system in lines 901-902 provide the functions "disable_irq" and "enable_irq".

FIG. 10 (combination of FIGS. 10A and 10B) depicts a portion of software instructions in a code file generated from a device specification (of FIGS. 5A and 5B) in a formal language and a software specification (of FIG. 6B) in another formal language for a runtime environment with a Linux operating system in an embodiment. The complete listing of the code file is included as Appendix C2. It may be appreciated that appropriate instructions may be generated in the code file to include the software instructions in the header file.

Lines 1000a-1000c are similar to lines 800a-800c. The value "184000" in line 1000b corresponds to the value "1.84M" specified in line 684 and the value "5" in line 1000c corresponds to the value specified for keyword "retry" in the "error_handling" section depicted in lines 691-693.

Lines 1001-1008 are similar to the lines 801-808 are generated as described above with respect to generation of lines 801-808, except that the value "1.84M" in the global variable named "g_frequency" is specified in line 684. Lines 1009-1018 and lines 1019-1023 are generated similarly to lines 809-818 and lines 819-823 respectively.

Lines 1024-1043 depict a function (name "isr_do_read") for interfacing with the ISR in the runtime environment and are generated since the ISR is specified as "split" for keyword "isr_type" in line 678. Lines 1044-1065 depict a function for handling hardware interrupts ("ISR_HW"). The instructions in the function are generated based on the interrupt specification (depicted in lines 584-588) in the device specification for the hardware device. In line 1049, the value of a user defined field in a register in the hardware device is read using the macro "IIR_IntPend_udfRd" to check for pending interrupts corresponding to the specification in line 585. Similarly, lines 1053-1055 (for the interrupt "RxDataAv" as specified in line 1053) and lines 1056-1058 (for the interrupt "TxRegEmpty" as specified in line 1056) are generated corresponding to the interrupts specified in lines 586a and 587a.

Lines 1066-1076 depicts a function for registration of interrupt handlers ("register_ISR") and is generated based on the values "linux" and "80186" for the keywords "os" and "name" in "processor_spec" as depicted in lines 655 and 662 respectively. It may be observed that no functions are generated for interfacing with the BSP, as the runtime environment is an operating system.

It may be appreciated that as the software specification specifies "POSIX" for the keyword "entry_point" in line 671, software instructions are generated as wrapper functions, which invoke the various functions shown in Appendix C1 and C2. The wrapper functions are generated to comply with pre-specified names as specified by the POSIX standard. A more comprehensive listing of the wrapper functions is included as Appendix C3 and C4.

It should be further appreciated that the features described above can be implemented in various embodiments as a desired combination of one or more of hardware, software and firmware. The description is continued with respect to an embodiment in which various features are operative when software instructions are executed.

11. Digital Processing System

Figure 11:
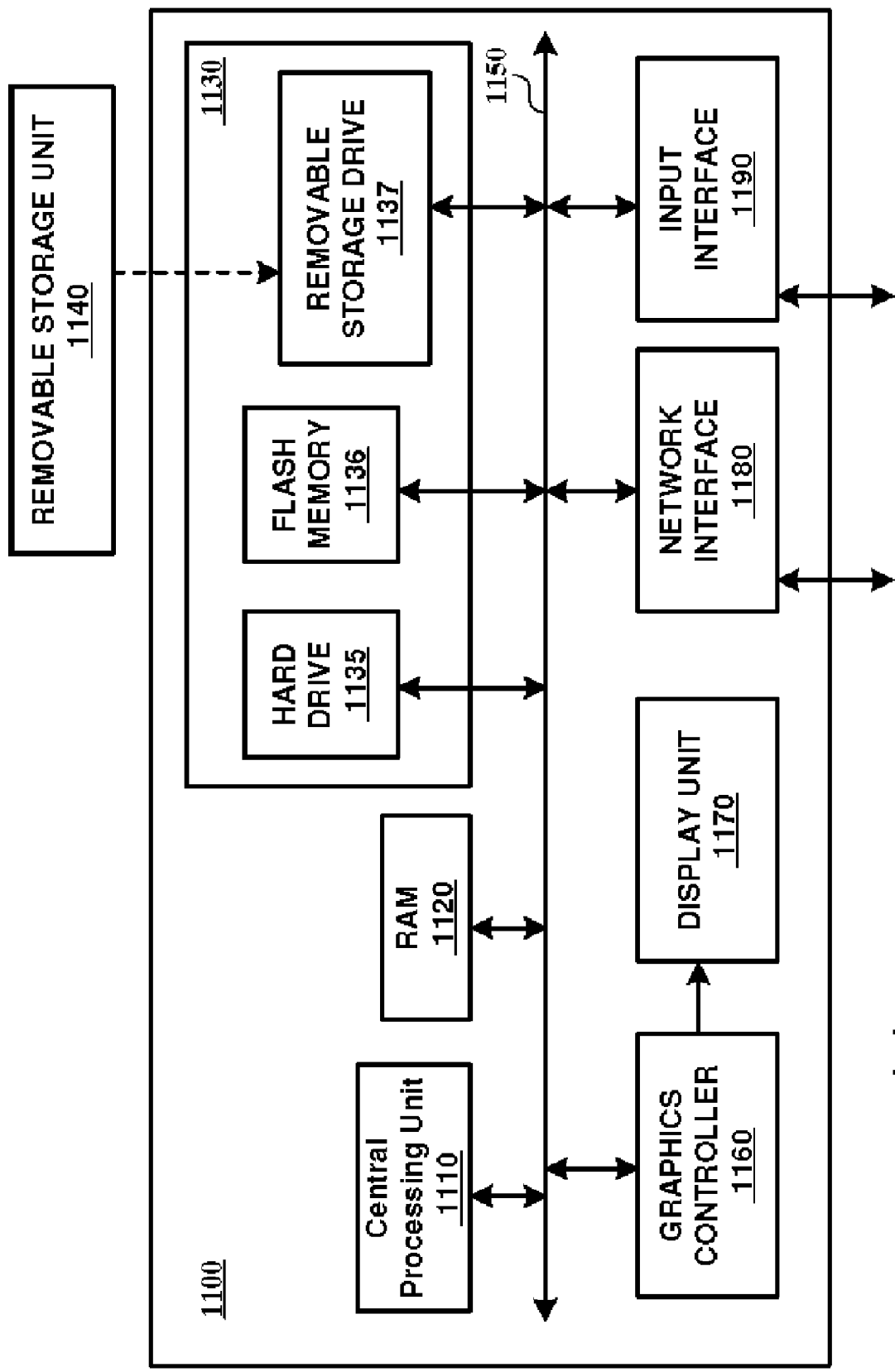
FIG. 11 is a block diagram illustrating the details of a digital processing system in which various aspects of the present invention are operative by execution of appropriate software instructions.

FIG. 11 is a block diagram illustrating the details of a digital processing system in which various aspects of the present invention are operative by execution of appropriate software instructions. Digital processing system 1100 may contain one or more processors such as central processing unit (CPU) 1110, random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general purpose-processing unit. RAM 1120 may receive instructions from secondary memory 1130 using communication path 1150.

Graphics controller 1160 generates display signals (e.g., in RGB format) to display unit 1170 based on data/instructions received from CPU 1110. Display unit 1170 contains a display screen to display the images defined by the display signals. Input interface 1190 may correspond to a key-board and/or mouse. Network interface 1180 provides connectivity to a network (e.g., network 110 using Internet Protocol), and may be used to communicate with other external systems.

Secondary memory 1130 may contain hard drive 1135; flash memory 1136 and removable storage drive 1137. Some or all of the data (e.g., device drivers generated, the various specifications noted above in FIGS. 5A-5B, and 6A-6B) and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable storage medium having stored therein computer software and/or data.

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of generating a device driver for a hardware device for which there is no said device driver within a user system, said device driver comprising a plurality of instructions and enabling a user application executing in a user system to communicate with said hardware device, said user system supporting said user application and said device driver in a runtime environment, said method comprising:

receiving a first specification in a formal language indicating a plurality of characteristics of said hardware device;

receiving a second specification in a formal language indicating a plurality of characteristics of said runtime environment, wherein said second specification comprises an operating system specification, and said runtime environment comprises existing devices within said user system; and generating said plurality of instructions according to said plurality of characteristics of said hardware device and said plurality of characteristics of said runtime environment such that said plurality of instructions execute on said user system and enable said user application to communicate with said hardware device, wherein when said second specification is changed to correspond to a second user system with a second runtime environment, a second device driver is generated for said second user system based on said second runtime environment, and wherein said first specification further specifies a plurality of registers present in said hardware device also in said formal language, said generating further comprises generating a first subset of instructions providing an interface for said user application to access said plurality of registers, wherein said first subset of instructions are contained in said plurality of instructions.

2. The method of claim 1, wherein said second specification further contains a program logic specifying the manner in which external devices communicate with said hardware device, and said generating forms said plurality of instructions incorporating said program logic according to said plurality of characteristics.

3. The method of claim 1, wherein said second specification indicates a first processor type for said user system and a second processor type for said second user system, wherein said generating forms a second plurality of instructions for said another user system, wherein said plurality of instructions is not identical to said second plurality of instructions.

4. The method of claim 1, wherein said second specification comprises a keyword that corresponds to a first operating system type for said user system and a second operating system type for said second user system, wherein said generating forms a second plurality of instructions for said another user system, wherein said plurality of instructions is not identical to said second plurality of instructions.

5. The method of claim 1, wherein said first specification further specifies a corresponding access restriction for each of said plurality of registers, wherein said interface accesses each register with privileges matching the corresponding access restriction.

6. The method of claim 1, wherein said first specification further contains a user-defined field having a name and specifying a plurality of bits contained in a register contained in said plurality of registers, wherein said generating forms an instruction containing said user-defined field to refer to said plurality of bits in said register.

7. The method of claim 6, wherein said first specification further specifies a constant for said user-defined field indicating a corresponding value for said plurality of bits, wherein said generating contains another instruction to set said user-defined field to said constant in said device driver.

8. The method of claim 1, wherein communication with said hardware device causes a change of state in said hardware device, wherein said program logic manipulates a subset of said plurality of registers in said hardware device and said change of state is caused by writing data to said subset of said plurality of registers, wherein a subset of said plurality of instructions write data to said subset of said plurality of registers to cause said change of state.

9. The method of claim 2, wherein said first specification further specifies a location at which data indicates whether any interrupts are pending, wherein said generating contains a subset of instructions to check for pending interrupts at said location.

10. The method of claim 9, wherein said first specification further identifies a plurality of interrupts, wherein said subset of instructions are further designed to handle each of said plurality of interrupts.

11. The method of claim 10, wherein said first specification further identifies the specific locations at which each of said plurality of interrupts are enabled, disabled, and cleared.

12. A method by which a developer generates a device driver for a hardware device of a user system, said method comprising:

receiving from a designer of said hardware device a first program logic according to a formal language, said first program logic specifying a manner in which external devices communicate with said hardware device;

receiving a second program logic according to a formal language indicating a plurality of characteristics of a runtime environment; and providing the first and second program logic and a plurality of characteristics of said hardware device and said plurality of characteristics of a runtime environment to a device driver generator, wherein said device driver generator forms a plurality of instructions constituting said device driver, wherein when said plurality of characteristics of said runtime environment is changed to correspond to another user system with another runtime environment and said device driver is generated for said another user system;

specifying a plurality of registers present in said hardware device also in said formal language; and generating a first subset of instructions providing an interface for a user application to access said plurality of registers, wherein said first subset of instructions are contained in said program logic.

13. A non-transitory program storage device readable by computer, and comprising a program of instructions executable by said computer to enable a user application executing in a user system to communicate with a hardware device and to perform a method of generating a device driver for said hardware device, said user system supporting said user application and said device driver in a runtime environment, said method comprising:

receiving a first specification in a formal language indicating a plurality of characteristics of said hardware device;

receiving a second specification in a formal language indicating a plurality of characteristics of said runtime environment; and generating said plurality of instructions according to said plurality of characteristics of said hardware device and said plurality of characteristics of said runtime environment such that said plurality of instructions execute on said user system and enable said user application to communicate with said hardware device, wherein when said second specification is changed to correspond to a second user system with a second runtime environment and a second device driver is generated for said second user system, and wherein said first specification further specifies a plurality of registers present in said hardware device also in said formal language, said generating further comprises generating a first subset of instructions providing an interface for said user application to access said plurality of registers, wherein said first subset of instructions are contained in said plurality of instructions.

14. A non-transitory program storage device readable by computer, and comprising a program of instructions executable by said computer to perform a method of generating a device driver for a hardware device, said device driver being designed for a user system, said method comprising:
  receiving from a designer of said hardware device a first program logic according to a formal language, said first program logic specifying a manner in which external devices communicate with said hardware device;
  receiving a second program logic according to a formal language indicating a plurality of characteristics of a runtime environment; and
  providing the first and second program logic and a plurality of characteristics of said hardware device and said plurality of characteristics of a runtime environment to a device driver generator, wherein said device driver generator forms a plurality of instructions constituting said device driver, and wherein when said plurality of characteristics of said runtime environment is changed to correspond to another user system with another runtime environment and said device driver is generated for said another user system;
  specifying a plurality of registers present in said hardware device also in said formal language; and
  generating a first subset of instructions providing an interface for a user application to access said plurality of registers, wherein said first subset of instructions are contained in said program logic.

15. An apparatus for generating a device driver for a hardware device, said device driver comprising a plurality of instructions and enabling a user application executing in a user system to communicate with said hardware device, said user system supporting said user application and said device driver in a runtime environment, said apparatus comprising:
  means for receiving a first specification in a formal language indicating a plurality of characteristics of said hardware device;
  means for receiving a second specification in a formal language indicating a plurality of characteristics of said runtime environment; and
  means for executing a set of instructions for generating said device driver for generating said plurality of instructions according to said plurality of characteristics of said hardware device and said plurality of characteristics of said runtime environment such that said plurality of instructions execute on said user system and enable said user application to communicate with said hardware device, wherein when said second specification is changed to correspond to a second user system with a second runtime environment, a second device driver is generated for said second user system,
  wherein said first specification further specifies a plurality of registers present in said hardware device also in said formal language, said generating further comprises generating a first subset of instructions providing an interface for said user application to access said plurality of registers, wherein said first subset of instructions are contained in said plurality of instructions.

16. An apparatus by which a developer generates a device driver being designed to operate a hardware device of a user system, said apparatus comprising:
  means for receiving from a designer of said hardware device a first program logic according to a formal language, said first program logic specifying a manner in which external devices communicate with said hardware device;
  receiving a second program logic according to a formal language indicating a plurality of characteristics of a runtime environment;
  means for executing a set of instructions for generating said device driver to form a plurality of instructions constituting said device driver; and
  means for providing the first and second program logic and a plurality of characteristics of said hardware device and said plurality of characteristics of a runtime environment to a device driver generator, wherein when said plurality of characteristics of said runtime environment is changed to correspond to another user system with another runtime environment and said device driver is generated for said another user system;
  means for specifying a plurality of registers present in said hardware device also in said formal language; and
  means for generating a first subset of instructions providing an interface for a user application to access said plurality of registers, wherein said first subset of instructions are contained in said program logic.

17. A method of generating a device driver for a hardware device, said device driver comprising a plurality of instructions and enabling a user application executing in a user system to communicate with said hardware device, said user system supporting said user application and said device driver in a runtime environment, said method comprising:
  receiving a first specification in a formal language indicating a plurality of characteristics of said hardware device;
  receiving a second specification in a formal language indicating a plurality of characteristics of said runtime environment, wherein said second specification comprises an operating system specification; and
  generating said plurality of instructions according to said plurality of characteristics of said hardware device and said plurality of characteristics of said runtime environment such that said plurality of instructions execute on said user system and enable said user application to communicate with said hardware device,
  wherein when said second specification is changed to correspond to a second user system with a second runtime environment, a second device driver is generated for said second user system based on said plurality of characteristics of said hardware device and said plurality of characteristics of said runtime environment, and
  wherein said first specification further specifies a plurality of registers present in said hardware device also in said formal language, said generating further comprises generating a first subset of instructions providing an interface for said user application to access said plurality of registers, wherein said first subset of instructions are contained in said plurality of instructions.

18. A method of generating a device driver for a hardware device, said device driver comprising a plurality of instructions that enable said hardware device to communicate with a user system, said plurality of instructions comprising an interrupt service routine (ISR), said user system supporting said device driver in a runtime environment, said method comprising:
  receiving a first specification in a formal language indicating a plurality of characteristics of said hardware device, wherein said plurality of characteristics comprises interrupts;
  receiving a second specification in a formal language indicating a plurality of characteristics of said runtime environment, wherein said plurality of characteristics comprises any of a nature of an ISR function, a synchronization of communication between said device driver and said ISR, and an interrupt request (IRQ) number, wherein said second specification comprises an operating system specification; and generating said plurality of instructions according to said plurality of characteristics of said hardware device and said plurality of characteristics of said runtime environment such that said plurality of instructions execute on said user system and enable said hardware device to communicate with said user system, wherein when said second specification is changed to correspond to a second user system with a second runtime environment, a second device driver comprising a second ISR is generated for said second user system based on said plurality of characteristics of said hardware device and said plurality of characteristics of said runtime environment.

19. The method of claim 18, wherein each portion of a plurality of specifications is identified by a corresponding name, wherein said plurality of specifications is said first specification and said second specification, and said first specification further indicates a manner in which said user application invokes for execution said portions of instructions having corresponding names.

20. The method of claim 19, wherein said manner is specified as user defined, wherein said generating further comprises enabling a user to specify said corresponding names of said portions.

21. The method of claim 19, wherein said manner is specified as a standard which already identifies said portions by corresponding pre-defined names, wherein said generating generates a wrapper which maps said pre-defined names to said plurality of portions such that when said user application invokes a first pre-defined name, the corresponding mapped portions are executed.

22. The method of claim 18, wherein said first specification further specifies a location at which data indicates whether any interrupts are pending, wherein said generating contains a subset of instructions to check for pending interrupts at said location.

23. The method of claim 22, wherein said runtime environment comprises an operating system, wherein a subset of characteristics contained in said plurality of characteristics indicates a manner in which said device driver is to communicate with a plurality of interrupt service routines (ISR) in said operating system, wherein said generating generates a subset of instructions to enable and disable each of said plurality of ISRs according to said manner.

24. The method of claim 22, wherein a first characteristic contained in said subset of characteristics specifies said ISR is of a single type or of a split type, wherein generating forms said plurality of instructions based on said type.

* * * * *